W. W. BROGA.
RESILIENT TIRE FOR VEHICLE WHEELS.
APPLICATION FILED FEB. 1, 1910.
1,035,078.
Patented Aug. 6, 1912.
4 SHEETS—SHEET 1.
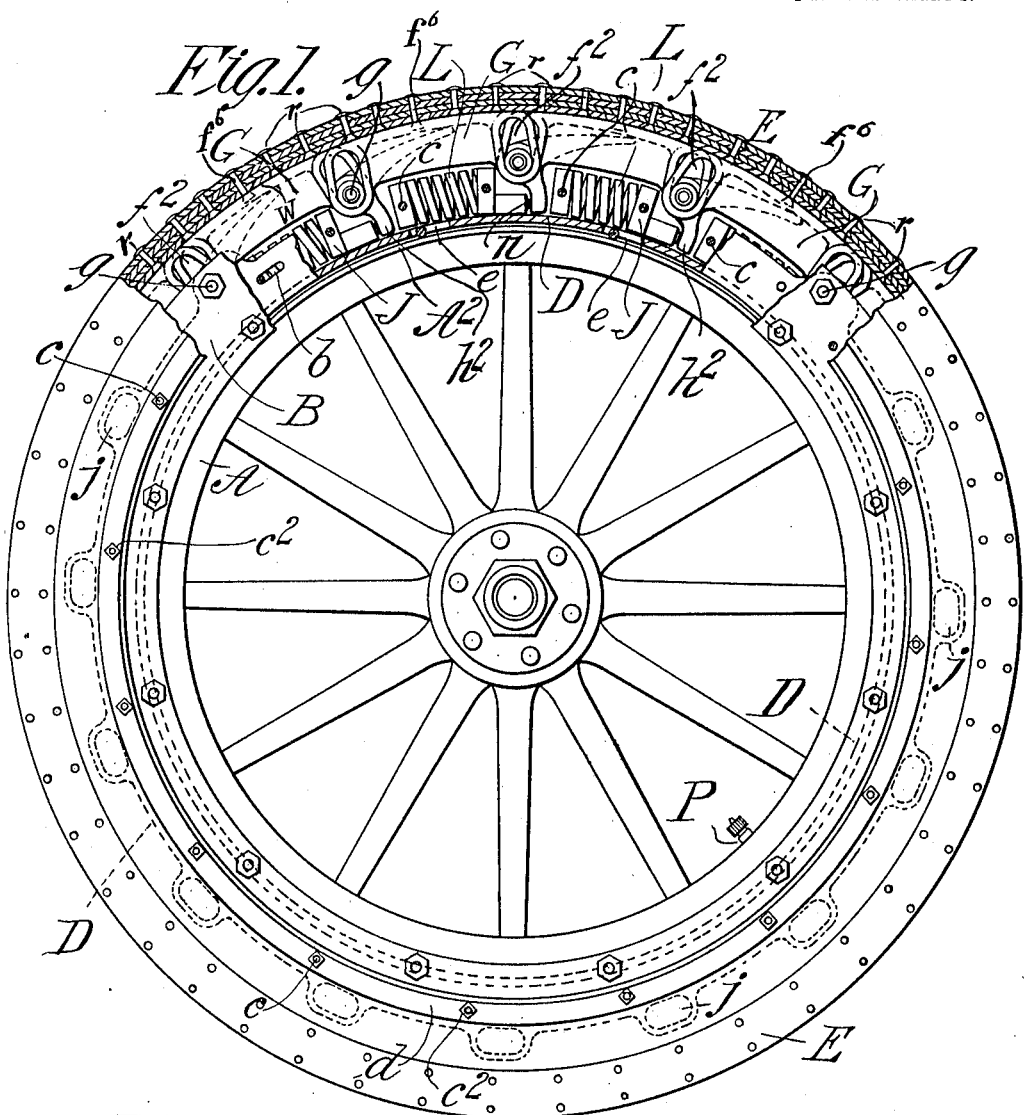
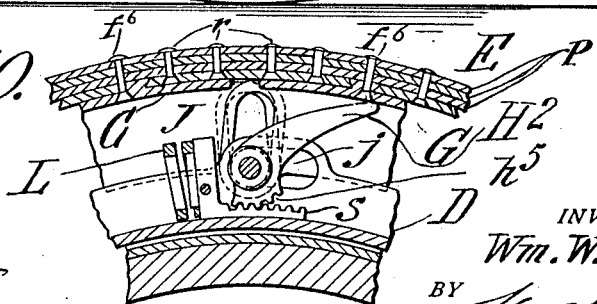
WITNESSES:
INVENTOR,
Wm. W. Broga.
BY
ATTORNEY.

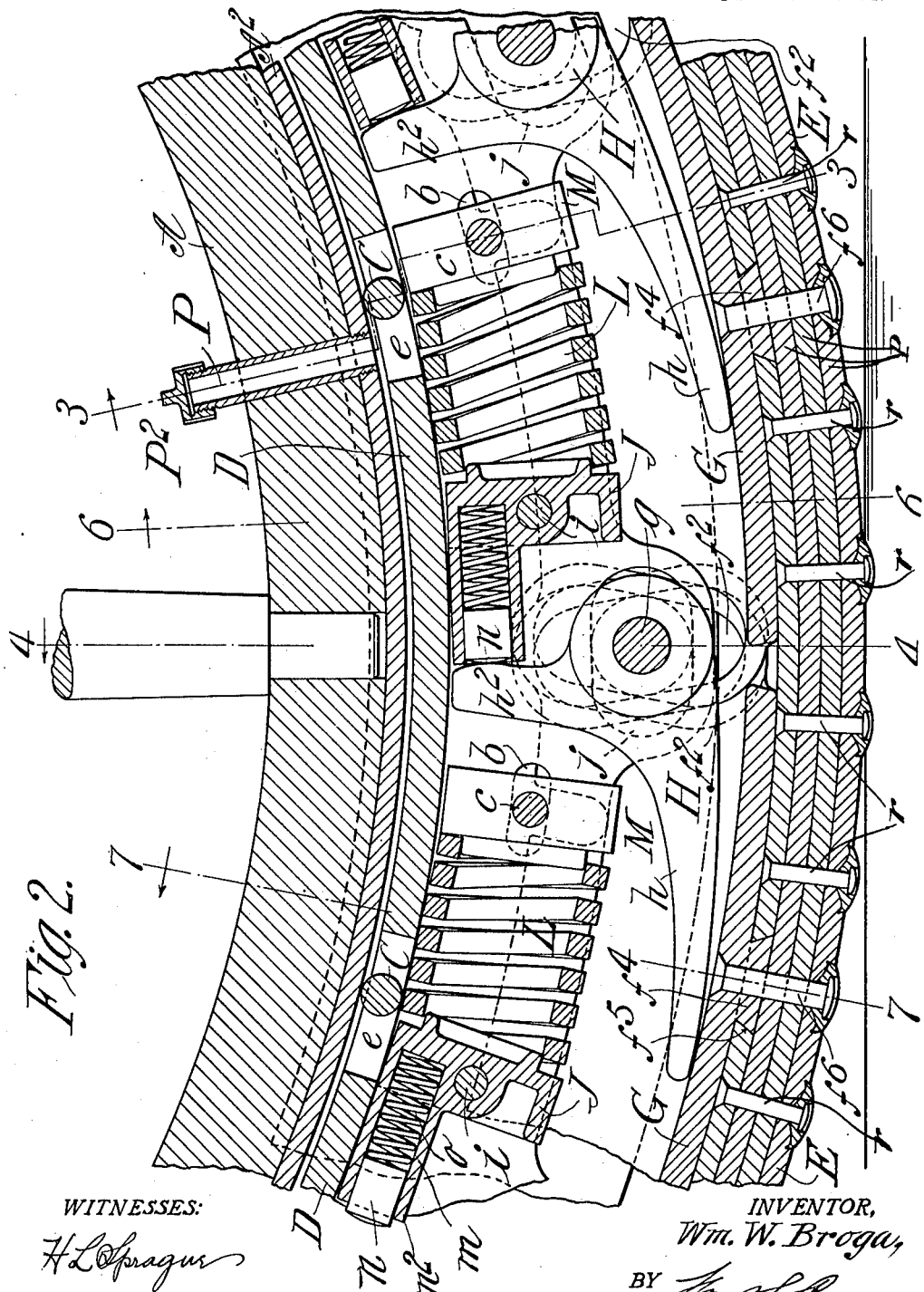

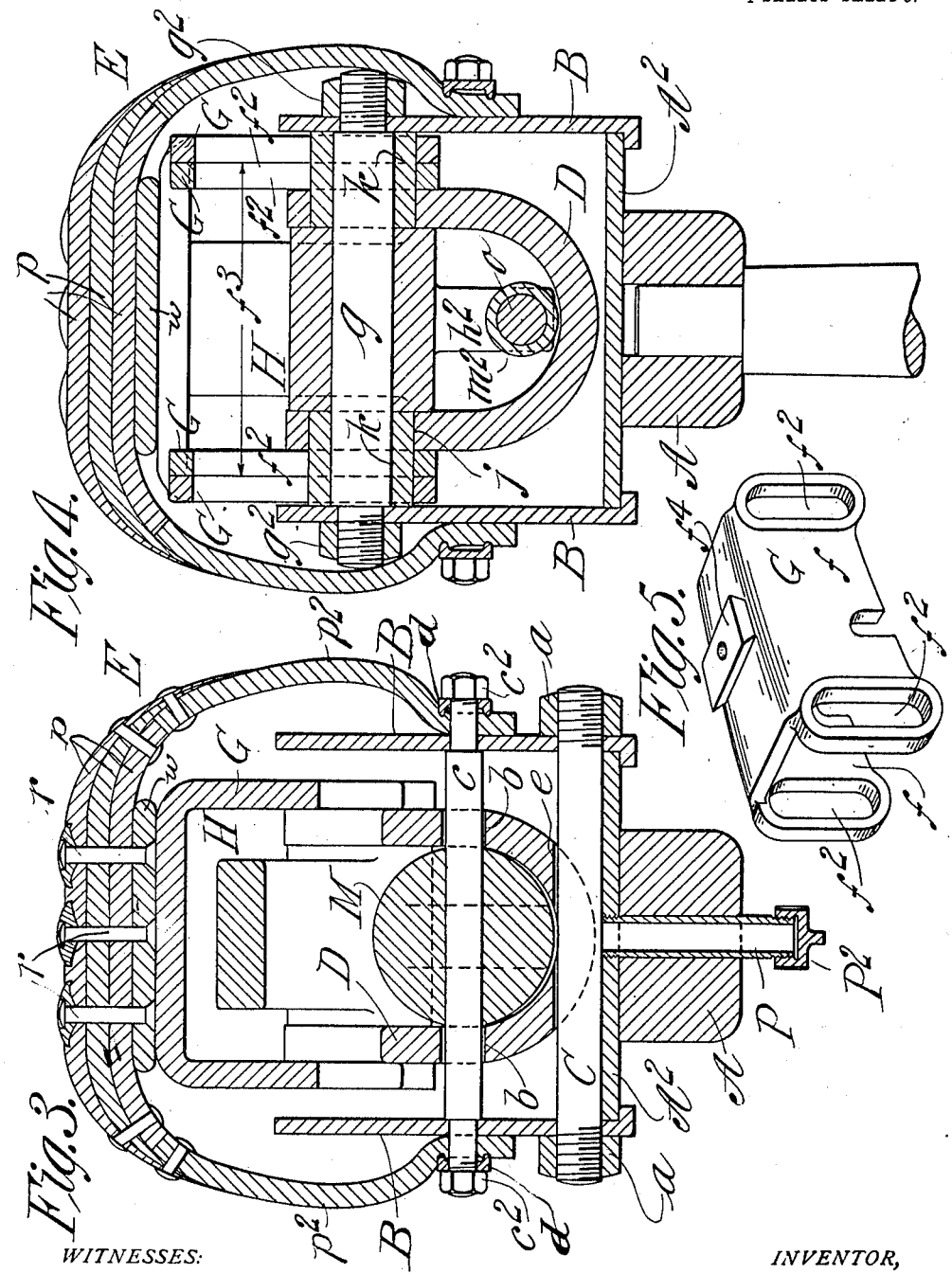

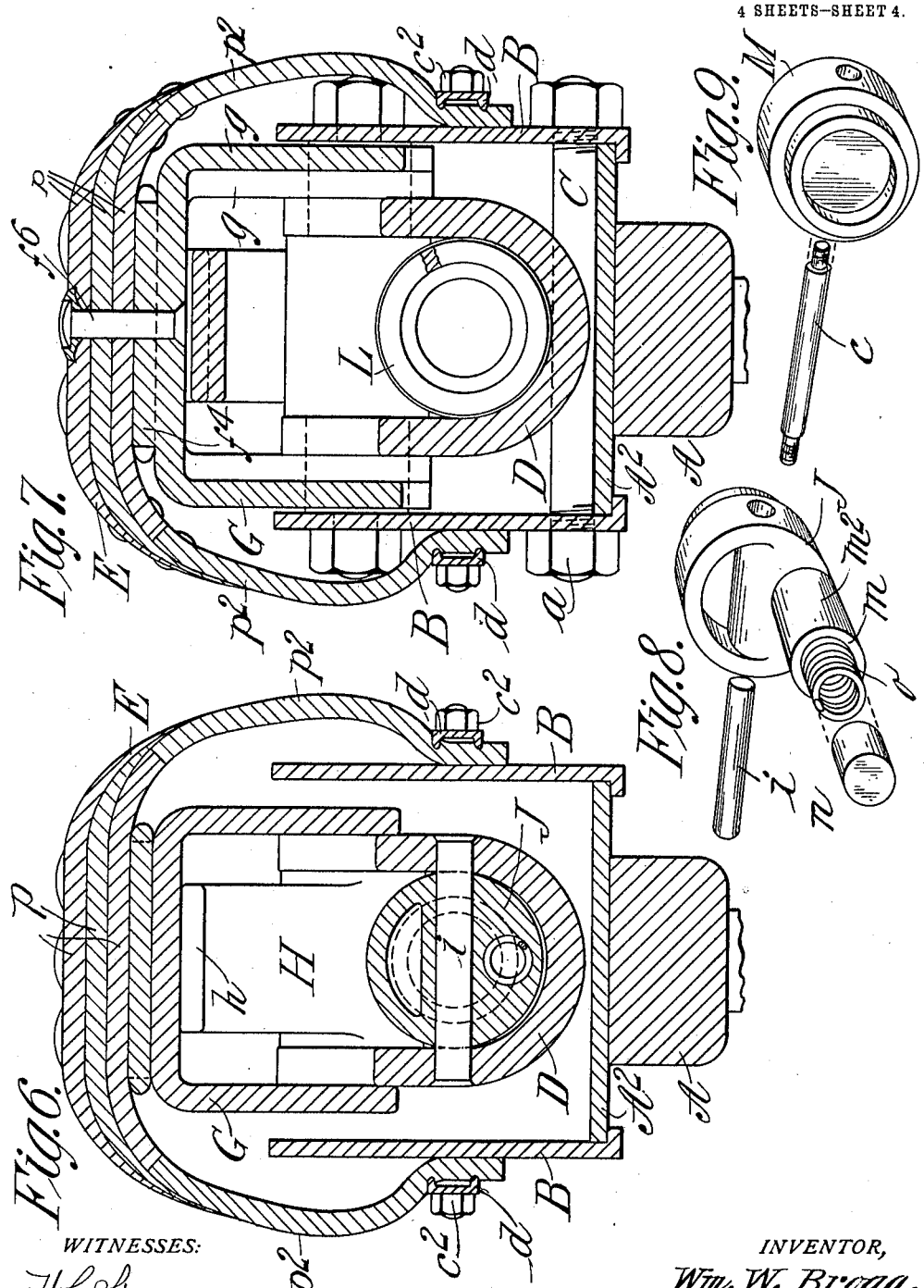

UNITED STATES PATENT OFFICE.

WILLIAM W. BROGA, OF SPRINGFIELD, MASSACHUSETTS.

RESILIENT TIRE FOR VEHICLE-WHEELS.

1,035,078. Specification of Letters Patent. Patented Aug. 6, 1912.

Application filed February 1, 1910. Serial No. 541,234.

*To all whom it may concern:*

Be it known that I, WILLIAM W. BROGA, a citizen of the United States of America, and resident of Springfield, in the county of Hampden and State of Massachusetts, have invented certain new and useful Improvements in Resilient Tires for Vehicle-Wheels, of which the following is a full, clear, and exact description.

This invention relates to resilient tires for wheels and has for its object to produce a tire which will give satisfactory cushioning results for an indefinitely prolonged period even when subjected to hard or rough usage under comparatively light or heavy loads.

An object of the invention may be otherwise stated as being to produce a resilient tire in which springs are employed (entirely doing away with any pneumatic tube or pneumatic appliance); and to provide an organization or combination and arrangement of parts so that when the tire is placed under a deflecting force any point wherever its tread may be, each and all of the comparatively large number of springs comprised in the tire will be equally under compression or stress and whereby violent and extreme yieldings of the springs are avoided by reason of the distribution of the strain throughout all of the springs of the series.

Other objects of the invention are to improve the tire in its details of construction.

The invention consists in the combinations and arrangements of parts and the constructions of certain of the parts all substantially as described in conjunction with the accompanying drawings and set forth in the claims.

In the drawings:—Figure 1 is a side elevation of an automobile wheel having my improved tire thereon, a portion of the latter being represented as broken away and in partial section for clearer illustration. Fig. 2 is a sectional view centrally through a portion of the rim of a vehicle wheel and through a portion of the improved tire, on a very much enlarged scale and on a plane at right angles to the axis of the tire provided wheel. Figs. 3, 4, 6 and 7 are cross sectional views respectively on the lines 3—3, 4—4, 6—6, and 7—7, Fig. 2. Fig. 5 is a perspective view of one of a series of saddle like members embodied in the tire. Fig. 8 is a perspective view of one of a series of metallic equipments comprised in the tire. Fig. 9 is a perspective view of further metallic equipments, a series of which are provided in the tire. Fig. 10 is a partial sectional view on the scale of Fig. 1, representing a slight modification in construction to be hereinafter referred to.

In the drawings,—A represents the rim or felly of an automobile wheel which may be of any suitable material, and form or design, the same having a circumferentially extending flat ring or rim $A^2$ understood as formed as part of or rigidly affixed to the felly and having at opposite sides thereof outstanding annular ring plates B B held to the rim-ring by the bolts C and nuts $a$ $a$,—these ring plates B B constituting with the rim ring $A^2$ an outwardly opening channeled formation for the felly portion of the wheel and serving as important factors as supports for parts and devices comprised in this invention.

D represents a ring, which in the present instance is represented as of a U-shaped formation, cross sectionally, the same somewhat loosely encircling the felly and its rim ring and being free and independent of the latter and capable of having a degree of rotative movement around the rim ring entirely independent of the latter and of the wheel which carries it. This ring D which, to avoid confusion of terms, and so that it may not be confounded with other annular or ring like parts of the improved structure, will be hereinafter referred to as the "floating ring;" and it has slightly curved slots $b$ in its opposite side walls through which rigid rods or studs $c$ are transversely extended (see Figs. 1, 2 and 3),—the extremities of these rods extending through the side ring plates B B and are held in confinement by the nuts $c^2$ which are also serviceable for the confinement of the clamp rings $d$ arranged at opposite sides of the wheel and which hold the flanks or inner edge portions of the outer tire covering E in its place. The cross sectionally U-shaped floating ring has slots or recesses $e$ in its base or portion adjacent the rim ring to render it free of, and to be unobstructed in its slight rotative movements by, the through bolts or studs C.

G G represent saddles which are of hollow construction or, more definitely, as represented in perspective in Fig. 5, in the form of inverted U-shaped downwardly and endwise open blocks or rigid shells having in their opposite side walls, $f$, at the ends of the latter vertically elongated openings $f^2, f^2$. Every other one of the saddles G of the series employed in the tire have, especially at their ends in which the apertures $f^2, f^2$ are formed, the outer or extreme transverse dimension as represented by the dimension line $f^3$, Fig. 4, while the relatively intermediate saddles are made with the distance between their opposite walls just enough wider to match over the outer surfaces of the first mentioned and alternated saddles, somewhat in the manner of chain links,—the overlapped end portions of the adjacent saddles being represented at the upper portion of Fig. 1. These saddles have engagements with and for supporting the tread portion E of the tire and receive when the tread portion is deflected under load inward movements, that is in lines radially toward the felly and serve as members for operating the levers H H.

The transverse studs $g$ or bolts having end supports on the opposite side ring plates B B and confined by the nuts $g^2$, constitute fulcrum supports for the levers H, guides to the inward and outward movements of the saddles and means for preventing the saddles from having any creeping motions relatively to the felly. The saddles may have interlocking engagements, if desired, with the internal portion of the tread or outer shoe of the tire, as by the dove-tail ribs $f^4$ on the backs of the saddles which fit in transverse dove-tail shaped channels $f^5$ therefor in the tread, and the saddles may be connected with the tread by the rivets $f^6$, as represented in Figs. 2 and 7.

Upon depression of the wheel and deflection of the ground-contacting tread portion, one or more of the saddles are positively moved toward the axis of the wheel, resulting in a swinging of the outer arms $h$ of the angular levers H which are located within and inclosed by the saddles, causing, by the inner arms $h^2$ of the levers a pushing movement, circumferentially of the wheel, of the blocks J which by the transverse studs $i$ connect them with and for slight oscillating motions on, the floating ring, so that under the movement imparted to any one, or perhaps two or three, of the blocks J by the levers adjacent the ground, the floating ring must be circumferentially moved, in a degree, relatively to the felly of the wheel. The blocks J being all connected as seen by the studs $i$ to the floating ring, and forming a plurality of pushers for the latter, compress all of the spiral springs L in the series, and which are distributed entirely around in the tire,—each and every spring being resisted at its end opposite that borne against by the lever adjacent thereto by a stop or abutment member which in the present instance is constituted by a ring shaped piece M which is connected to the opposite side plates B B of the wheel rim by the aforementioned transverse studs or through bolts $c$,—it being appreciated that such, or an equivalent form of, connections, of the parts M with the rim of the tire, render the spring rests or abutments M to all intents and purposes the same as integral portions of the rim. And so no matter whichever one, two or three of the levers near the ground may be operated by the deflected tread portion of the tire through the saddle or saddles, the resultant effect will be that the ring caused to be circumferentially moved will, through all of its pushers J, compress in equal extent or degree each and every one of the spiral springs L distributed in uniformly spaced relations entirely around the tire.

The circumferentially movable floating ring D has slots $j$, the lengths of which range in the circular length of the ring, and which slots are represented in Figs. 2, 4 and 10, and by dotted lines in Fig. 1. These slots provide that the floating ring which is supported in numerous places in its circular length on the transverse rim sustained studs $g$ will be free for its all sufficient extent of circumferential or rotatively shifting movements relatively to the rim and without being obstructed by the said cross studs on which they are supported.

$k$ $k$ represent roller bushings which surround the opposite end portion of the cross stud $g$ inside of the side ring plates B B, the same constituting anti-friction members not only for the circumferentially moving floating ring but for the substantially radially moving saddles,—it being noted that the roller bushings are of a length, each, approximately equal to the combined thicknesses of the slotted end portions of the matched together saddle walls and an adjacent side wall of the trough or U-shaped floating ring.

Fig. 2 is to be understood as representing the ground contacting portion of the tire as being under a natural degree of flexure or deflection in a direction inwardly toward the wheel axis so that at least one of the levers H is caused to have a positive rocking movement and cause its arm $h^2$ to directly impart a movement to the member J, which is to all intents and purposes a fixture of the floating ring,—although this member J may have a degree of oscillation so that its line of pressure will always be maintained truly endwise against the spring L. Now inasmuch as the floating ring being moved by one of the rocking levers H, the many other of the members or spring pushers J at spaced locations around the tire and remote from the lever or levers positively rocked by the ground contacting deflected tread portion of the tire, will be bodily carried by the ring D away from circumferentially moving, said ring, and a series of members carried by, and movable as one with, said ring, and springs between the ring carried members and the rim carried abutments.

4. In a resilient tire for a vehicle wheel, in combination, a tire supporting rim, a circumferentially arranged flexible shoe or tread member, a ring free of, and circumferentially movable relatively to, the rim, abutments for springs carried by the rim, lever fulcrums also supported by the rim, rocking levers, on said fulcrums having engagements with, and for circumferentially moving, said ring, a series of members carried by, and movable as one with, said ring, springs between the ring carried members and the rim carried abutments, and a rigid saddle between each lever and the flexible tread member.

5. In a resilient tire for a vehicle wheel, in combination, a tire supporting rim, a circumferentially arranged flexible shoe or tread member, a ring free of, and circumferentially movable relatively to, the rim, abutments for springs carried by the rim, lever fulcrums also supported by the rim, rocking levers, on said fulcrums, having engagements with, and for circumferentially moving, said ring, a series of members carried by, and movable as one with, said ring, springs between the ring carried members and the rim carried abutments, and a rigid saddle between each lever and the flexible tread member, and having a means for preventing creeping movements of the saddles relatively to the tread member.

6. In a resilient tire for a vehicle wheel, in combination, a tire supporting rim, a circumferentially arranged flexible shoe or tread member, a ring free of, and circumferentially movable relatively to, the rim, abutments for springs carried by the rim, lever fulcrums also supported by the rim, rocking levers, on said fulcrums having engagements with, and for circumferentially moving, said ring, a series of members carried by, and movable as one with, said ring, springs between the ring carried members and the rim carried abutments, and a rigid saddle between each lever and the flexible tread member, and said saddles having engagements with the lever fulcrums for guidance in their inward and outward substantially radial movements.

7. In a resilient tire for a vehicle wheel, in combination, a tire supporting rim, a circumferentially arranged flexible shoe or tread member, a ring free of, and circumferentially movable relatively to, the rim, abutments for springs carried by the rim, lever fulcrums also supported by the rim, rocking angular levers mounted on said fulcrums, and having engagements with, and for circumferentially moving, said ring, a series of members carried by, and movable as one with, said ring, springs between the ring carried members and the rim carried abutments, trough shaped rigid saddles having their backs between the outer arms of said angular levers and the tread member, free for substantially radial movements, and means for preventing said saddles from having circumferential movements relatively to the rim.

8. In a resilient tire for a vehicle wheel, the combination with a rim, of a flexible tread member or shoe, a ring circumferentially movable relatively to the rim, a series of springs arranged about the rim having connections or engagements with the latter and otherwise free for compression and reaction relatively to their engaged portions, and levers arranged around the rim, individually subject to movement by deflected portions of the flexible tire tread and operative to circumferentially move said ring, said ring being operative against the stress of all of the circularly arranged series of springs, and yielding means between the ring and the individual levers for normally maintaining the latter in their dispositions toward the tread member.

9. In a resilient vehicle wheel tire, in combination, a rim, a flexible outer shoe or tread member, a ring circumferentially movable relatively to the rim, a series of spring rests or abutments sustained in spaced relations by the rim, a series of spring engaging members carried in spaced relations by the ring, springs interposed between said engaging members and said abutments, a series of angular rocking levers having fulcrum supports on the rim operatively subject to the deflective movements of the tread member and having their inner arms coacting with said ring carried spring engaging members, and spring appliances interposed between the spring engaging members and the inner arms of said rocking levers.

10. In a resilient vehicle wheel tire, in combination, a rim, a flexible outer shoe or tread member, a ring circumferentially movable relatively to the rim, a series of spring rests or abutments sustained in spaced relations by the rim, a series of spring engaging members carried in spaced relations by the ring, having plunger pockets therein, springs interposed between said engaging members and said abutments, a series of angular rocking levers having fulcrum supports on the rim operatively subject to the deflective movements of the tread member and having their inner arms coacting with said ring carried spring engaging members, and spring pressed plungers in said pockets yieldingly bearing against the inner arms of the rocking levers.

11. A rim having opposite annular side walls, a ring circumferentially movable relcontact with the respectively adjacent arms $h^2$ of nearly all of the rocking levers of the series, establishing perhaps a tendency for these levers to vibrate or rattle; and to overcome this possibility the blocks or pusher members J are constructed with pockets $m$ in elongated or hub provided portions $m^2$ thereof in which are fitted plunger blocks $n$ which are outwardly forced by the spiral springs $o$ held in compression between the plunger blocks and the inner end walls on the pockets.

The tread member or outer shoe for the tire, represented by E, may be of any suitable material and specific form; and in the illustrations here given it is understood as composed of several layers $p$ $p$ of leather to which circularly continuous side or flank extensions $p^2$ are provided, these portions $p^2$ being secured to the tread portions P by riveting, and these extending inwardly and to have overlapping engagements on the opposite sides of the ring plates B of the rim and held by the clamp rings $d$ which as hereinbefore stated are held in their confinements by the nuts $c^2$ which hold the transverse studs $c$ in their given set positions on the trough shaped wheel rim. As specifically shown, a layer $w$ of any suitable material such as leather or semi-rigid fiber is interposed between the saddles and the tread portion of the tire, the same being understood, however, as, to all intents and purposes, being a part of the tire tread. The upstanding dove-tail rib $f^4$ at the back of each saddle G may have an interlocked engagement in a correspondingly shaped recess therefor transversely formed in the inner portion $w$ of the tread member or shoe. The layers constituting the tread portion of the shoe may be united by rivets $r$ which increase the durability of the appliances and also serve as antiskidding elements. The floating ring having the form of a trough and the saddles also of trough form constitute in their matched or partially telescoped relations a sheath or inclosing casing for the respective series of springs L, rocking levers H, spring pushers J, and the spring rests or abutments M. As perceived in the several cross sectional views, this tire together with the rim B tightly incloses an annular chamber in which the novel operating devices comprised in this invention are contained; and this chamber may be filled with oil or other lubricant through the tube P at the outer end of which a detachable closing cap $P^2$ is provided.

In Fig. 10 the floating ring D is provided with a slightly curved rack $s$ represented as a foot piece of spring pusher J and the lever $H^2$ which derives its rocking movement from the flexure of the tread member has in substitution of the angularly extended arm $h^2$ as represented in the other views of the drawings a gear toothed portion $h^5$ which meshes with said rack $s$, and thus a substantially equivalent means for imparting the circumferential movement to the floating ring is exemplified.

Although Figs. 1 to 9 of the drawings herewith are devoted to illustration of a resilient tire comprising a preferred combination and arrangement of parts for the attainment of the primary object of the invention (that is the resisting of deflection at any part of the tire by distributed stress entirely around the tire against a comparatively large number of springs), I desire expressly to state that my invention is not limited to the form and details of construction here provided and with particularity described, for many changes relating to matters subordinate to the broad aspect of the invention may be made without departing from the latter.

I claim:—

1. In a resilient tire for a vehicle wheel, the combination with a rim, of a flexible tread portion, a ring circumferentially movable relatively to the rim, a series of springs arranged about the rim having connections or engagements with the latter and otherwise free for compression and reaction relatively to their engaged portions, and levers arranged around the rim, individually subject to movement by deflected portions of the flexible tire tread and operative to circumferentially move said ring, said ring being operative against the stress of all of the circularly arranged series of springs.

2. In a resilient tire for a vehicle wheel, the combination with a rim, of a flexible tread member, a ring circumferentially movable relatively to the rim, a series of springs arranged around about in the tire having connections or engagements with the rim and otherwise free for compression and reaction relatively to their engaged portions, levers arranged around, and pivotally sustained by, the rim, rigid saddles between the levers and the inner surface of the flexible tread member, any one of the levers when swung being operative to circumferentially move said ring, and said ring in turn operating against the stress of all of the circularly arranged series of springs.

3. In a resilient tire for a vehicle wheel, in combination, a tire supporting rim, a circumferentially arranged flexible shoe or tread member, a ring free of, and circumferentially movable relatively to, the rim, abutments for springs carried by the rim, lever fulcrums also supported by the rim, rocking levers on said fulcrums subject to movements by deflections of respectively adjacent portions of the flexible tread member, and having engagements with, and for atively to the rim, abutments at intervals supported by the rim, levers having fulcrums, supported by the opposite side walls of the rim, springs seated against said abutments and with all of which said ring has strain imposing engagements, and a flexible tire tread appliance, operative, by deflection of its any part, to operate an adjacent lever and through such lever to circumferentially move said ring.

12. In a resilient tire, a rim having opposite annular side walls, studs transversely extending between and supported by said side walls a floating ring of trough shape having slots in its opposite side portions and engaged by said slotted portions with said studs, rocking levers fulcrumed on said studs and operated by deflections of the tread member, abutments at intervals supported by the rim, spring pusher members carried by the floating ring, springs interposed between said pusher members and said abutments, the levers having motion imparting engagements with the floating ring.

13. In a resilient tire, in combination, a trough shaped rim, abutment studs transversely extending, at intervals, between the opposite walls of the rim, and lever supporting studs also transversely extended at intervals between and supported by the opposite side walls of the rim, a floating ring of trough shape having slots in its opposite side members and by such slotted portions having supporting and guiding engagements with the lever studs, and having in its opposite sides further slots whereby it is unobstructedly movable relatively to the transverse abutment studs, spring pusher members fixed in the floating ring, at intervals, a tread member, rocking levers fulcrumed on said lever studs, arranged to be operated by the deflections of the tread member and operative to circumferentially move the floating ring, and springs between the pusher members and said abutment studs.

14. In a resilient tire, in combination, a trough shaped rim, abutment studs transversely extending, at intervals, between the opposite walls of the rim, and lever supporting studs also transversely extended at intervals between and supported by the opposite side walls of the rim, a floating ring of trough shape having slots in its opposite side members and by such slotted portions having supporting and guiding engagements with the lever studs, and having in its opposite sides further slots whereby it is unobstructedly movable relatively to the transverse abutment studs, spring pusher members pivotally mounted in the floating ring at intervals, a tread member, rocking levers fulcrumed on said lever studs, arranged to be operated by the deflections of the tread member and operative to circumferentially move the floating ring, abutment pieces mounted for oscillation on said abutment studs, and springs between the pivotally mounted pusher members and said oscillatory abutment pieces.

Signed by me at Springfield, Mass., in presence of two subscribing witnesses.

WILLIAM W. BROGA.

Witnesses:
 WM. S. BELLOWS,
 G. R. DRISCOLL.

---

Copies of this patent may be obtained for five cents each, by addressing the "Commissioner of Patents, Washington, D. C."